United States Patent
Kim et al.

(10) Patent No.: US 12,254,519 B1
(45) Date of Patent: Mar. 18, 2025

(54) COMPLIANCE BURDEN DETERMINATION FOR AN ENTITY HAVING ESTABLISHED NEXUS WITH ONE OR MORE DOMAINS

(71) Applicant: Avalara, Inc., Seattle, WA (US)

(72) Inventors: Stefan Kim, Maple Valley, WA (US); Nikki Nash, Bremerton, WA (US)

(73) Assignee: Avalara, Inc., Seattle, WA (US)

( * ) Notice: Subject to any disclaimer, the term of this patent is extended or adjusted under 35 U.S.C. 154(b) by 359 days.

(21) Appl. No.: 16/862,303

(22) Filed: Apr. 29, 2020

Related U.S. Application Data

(60) Provisional application No. 62/950,291, filed on Dec. 19, 2019.

(51) Int. Cl.
 *G06Q 40/12* (2023.01)
 *G06Q 10/0631* (2023.01)
 *G06Q 10/105* (2023.01)
 *G06Q 10/1093* (2023.01)
 *G06Q 30/018* (2023.01)
 *G06Q 30/0283* (2023.01)

(52) U.S. Cl.
 CPC ..... *G06Q 40/125* (2013.12); *G06Q 10/06315* (2013.01); *G06Q 10/105* (2013.01); *G06Q 10/1097* (2013.01); *G06Q 30/018* (2013.01); *G06Q 30/0283* (2013.01)

(58) Field of Classification Search
 CPC .................................................. G06Q 40/125
 See application file for complete search history.

(56) References Cited

U.S. PATENT DOCUMENTS

| | | | |
|---|---|---|---|
| 7,783,536 B2 | 8/2010 | William et al. | |
| 7,933,803 B1 | 4/2011 | Nadler et al. | |
| 8,620,578 B1 | 12/2013 | Brown et al. | |
| 8,725,407 B2 | 5/2014 | Hurley et al. | |
| 9,760,915 B2 | 9/2017 | Pavlou et al. | |
| 10,445,818 B1 | 10/2019 | Chowdhary | |
| 10,769,611 B2 | 9/2020 | McNeel | |
| 11,189,365 B2* | 11/2021 | Beltre ............... | G06Q 10/06398 |
| 2007/0136158 A1 | 6/2007 | Rawlings et al. | |
| 2007/0136159 A1 | 6/2007 | Rawlings et al. | |

(Continued)

OTHER PUBLICATIONS

Barnawi, Ahmed, et al. "An anti-pattern-based runtime business process compliance monitoring framework." International Journal of Advanced Computer Science and Applications 7.2 (2016). (Year: 2016).*

(Continued)

*Primary Examiner* — Andre D Boyce
(74) *Attorney, Agent, or Firm* — Jeremiah J. Baunach; Frontier IP Law PLLC

(57) ABSTRACT

A specialized service engine receives data from an entity located in one domain about transactions performed by the entity with other entities from another domain. The service engine determines if the entity must follow the rules regarding selected resources in the other domain. The service engine then determines which of the rules established by the other domain the entity must follow. The service engine then determines and communicates to another computer of the entity the burden of complying with the rules of the other domain. The service engine then further computes the cost of the burden, and communicates the computed cost to the other computer.

19 Claims, 11 Drawing Sheets

(56) References Cited

U.S. PATENT DOCUMENTS

| | | | | |
|---|---|---|---|---|
| 2008/0282320 | A1* | 11/2008 | DeNovo | G06F 21/604 726/1 |
| 2009/0119141 | A1* | 5/2009 | McCalmont | G06Q 10/0639 705/7.41 |
| 2010/0114628 | A1* | 5/2010 | Adler | G06Q 10/063 705/7.11 |
| 2014/0122377 | A1* | 5/2014 | Goodman | G06Q 30/02 706/11 |
| 2014/0297356 | A1* | 10/2014 | Jayade | G06F 16/21 705/7.26 |
| 2016/0080422 | A1* | 3/2016 | Belgodere | G06N 5/046 706/47 |
| 2017/0061445 | A1* | 3/2017 | Sunkle | G06F 40/205 |
| 2017/0236129 | A1* | 8/2017 | Kholkar | G06F 40/30 705/317 |
| 2017/0287090 | A1* | 10/2017 | Hunn | H04L 9/0643 |
| 2018/0285886 | A1* | 10/2018 | Yan | G06N 20/00 |
| 2019/0018968 | A1* | 1/2019 | Ronca | G06F 11/3452 |
| 2019/0171438 | A1* | 6/2019 | Franchitti | G06N 20/00 |
| 2020/0334282 | A1* | 10/2020 | Dasgupta | G06N 3/0454 |
| 2021/0049155 | A1* | 2/2021 | Markovic | G06F 16/24553 |

OTHER PUBLICATIONS

Bharosa, Nitesh, et al. "Tapping into existing information flows: The transformation to compliance by design in business-to-government information exchange." Government Information Quarterly 30 (2013): S9-S18. (Year: 2013).*

Nekvi, Md Rashed I., and Nazim H. Madhavji. "Impediments to regulatory compliance of requirements in contractual systems engineering projects: a case study." ACM Transactions on Management Information Systems (TMIS) 5.3 (2014): 1-35. (Year: 2014).*

* cited by examiner

FIG. 5

SCREEN 518

From your data, you have nexus with these new jurisdictions: ⟵ 502

Alabama, Arkansas, Georgia, Colorado, California, Illinois, Indiana, Iowa, Kentucky, Louisiana, Mississippi, Missouri, North Carolina, South Carolina, South Dakota, Tennessee, Texas Your additional projected compliance cost for these 17 states: (*Click here to get individual filing calendars*) ⟵ 581

Rate: $50/hr *edit* ⟵ 570

| new jdx | Return to be filed | estimated time to complete per your data – *update* data (hours) | Estimated total: ⟵ 572 |
|---|---|---|---|
| A | quarterly | 3 | $150 quarterly |
| B | annually | 9 | $450 annually |
| C | monthly | 1 | $50 monthly |
| D | semi-annually | 4 | $200 semi-annually |
| ... | | | |
| Total: | $2,050 annually | | |

| Sunday | Monday | Tuesday | Wednesday | Thursday | Friday | Saturday |
|---|---|---|---|---|---|---|
| 1 | 2 | 3 | 4 | 5 | 6 | 7 |
| 8 | 9 710 | 10 Reconciliation Date for Form A and B | 11 Prepayment for Form A 712 | 12 714 | 13 Ensure funds for Remittance of Form A in place | 14 |
| 15 | 16 716 | 17 Ensure funds for Remittance of Form B in place | 18 Form A Due Remittance of Form A Due | 19 720 | 20 Form B Due Remittance of Form B Due | 21 |
| 22 | 23 | 24 | 25 718 | 26 | 27 | 28 |
| 29 | 30 | 31 | | | | |

COMPLIANCE BURDEN DETERMINATION FOR AN ENTITY HAVING ESTABLISHED NEXUS WITH ONE OR MORE DOMAINS

SUMMARY

Businesses generally collect information relating to their operations, such as by using enterprise resource planning ("ERP") software applications or accounting applications. ERP applications manage information relating to a business's activities, such as sales, resource management, production, inventory management, delivery, billing, and so on. Compliance with the rules concerning selected resources for the business's activities in separate domains requires the businesses to take certain actions such as making payments, completing and submitting paperwork, determining if a business must comply with rules in a certain domain, and so on. ERP applications, accounting applications, ecommerce applications and other conventionally used applications fail to efficiently provide accurate, reliable per-domain estimations of the time and resources a business must allocate to take actions to ensure that they comply with various different rules in various different domains.

To solve the above technical problems, disclosed herein is a method including receiving, by a computer system, datasets, each data set including information about transactions performed by a certain entity that does not belong in a first domain with one or more entities that belong in the first domain; looking up, by the computer system, nexus rules for entities that do not belong in the first domain to establish a nexus with the first domain based on transactions of the entities that do not belong in the first domain with other entities that belong in the first domain; determining, by the computer system, and from the received datasets and from the looked-up nexus rules, that the certain entity has established a nexus with the first domain; looking up, by the computer system and responsive to the certain entity having established the nexus, filing rules of the first domain which are applicable to the certain entity due to the certain entity having established the nexus; computing, by the computer system and from the looked-up filing rules and the received datasets, an estimated compliance cost for the certain entity to comply with the looked-up filing rules; and causing, by the computer system, the estimated compliance cost to be communicated to a computing device.

Also, disclosed herein is a method for computing the estimated compliance cost, including: inputting an hourly rate; determining, from the received datasets, a total number of the transactions; determining, based on the looked-up filing rules, an estimated number of total hours for the certain entity to procure services to facilitate compliance with the filing rules for the determined total number of the transactions; and computing the estimated compliance cost based on the hourly rate and the determined estimated number of total hours.

Also disclosed herein is a method for determining an estimated compliance cost where the entity does not belong in each domain of a plurality of domains, including: receiving, by a computer system, datasets, each dataset including information about transactions performed by the certain entity with a plurality of entities in which each domain of the plurality of domains is a domain in which at least one of entity of the plurality of entities belongs; and for each domain of the plurality of domains: looking up, by the computer system, nexus rules for entities that do not belong in the domain to establish a nexus with the domain based on transactions of the entities that do not belong in the domain with other entities that belong in the domain; determining, by the computer system, and from the received datasets and from the looked-up nexus rules for entities that do not belong in the domain, that the certain entity has established a nexus with the domain; looking up, by the computer system and responsive to the certain entity having established the nexus with the domain, filing rules of the domain which are applicable to the certain entity due to the certain entity having established the nexus with the domain; computing, by the computer system, and from the looked-up filing rules of the domain and from the received datasets, an estimated compliance cost for the certain entity to comply with the looked-up filing rules of the domain; and causing, by the computer system, the estimated compliance cost for the certain entity to comply with the looked-up filing rules of the domain to be communicated to a computing device.

Also disclosed herein is a system including at least one processor and a memory coupled to the at least one processor, the memory storing instructions that, when executed by the at least one processor, cause the system to perform operations disclosed herein. For example, the instructions stored on the memory of the system, when executed by the at least one processor, may cause the system to perform operations including: receiving datasets, each data set including information about transactions performed by a certain entity that does not belong in a first domain with one or more entities that belong in the first domain; looking up nexus rules for entities that do not belong in the first domain to establish a nexus with the first domain based on transactions of the entities that do not belong in the first domain with other entities that belong in the first domain; determining, from the received datasets and from the looked-up nexus rules, that the certain entity has established a nexus with the first domain; looking up, responsive to the certain entity having established the nexus, filing rules of the first domain which are applicable to the certain entity due to the certain entity having established the nexus; computing, from the looked-up filing rules and the received datasets, an estimated compliance cost for the certain entity to comply with the looked-up filing rules; and causing the estimated compliance cost to be communicated to a computing device.

Also disclosed herein is a non-transitory computer-readable storage medium having computer-executable instructions stored thereon that, when executed by at least one processor, cause a system to perform operations disclosed herein. For example, the non-transitory computer-readable storage medium hay have computer-executable instructions stored thereon that, when executed by at least one processor, cause the system to perform operations including: receiving datasets, each data set including information about transactions performed by a certain entity that does not belong in a first domain with one or more entities that belong in the first domain; looking up nexus rules for entities that do not belong in the first domain to establish a nexus with the first domain based on transactions of the entities that do not belong in the first domain with other entities that belong in the first domain; determining, from the received datasets and from the looked-up nexus rules, that the certain entity has established a nexus with the first domain; looking up, responsive to the certain entity having established the nexus, filing rules of the first domain which are applicable to the certain entity due to the certain entity having established the nexus; computing, from the looked-up filing rules and the received datasets, an estimated compliance cost for the certain entity to comply with the looked-up filing rules; and causing the estimated compliance cost to be communicated to a computing device Advantages of use cases of embodiments are that a compliance burden with rules by fulfilling such requirements regarding selected resources can be determined and presented to an entity, and further the cost of such compliance (the "compliance cost") can be estimated and also presented to the entity.

BRIEF DESCRIPTION OF THE SEVERAL VIEWS OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 5 depicts an example jurisdiction compliance cost display graphical user interface, according to various embodiments of the present disclosure.

FIG. 7 depicts an example compliance cost calendar graphical user interface, according to various embodiments of the present disclosure.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, that embodiments of the inventive subject matter may be practiced without these specific details. In general, well-known structures and methods associated with underlying technology have not been shown or described in detail to avoid unnecessarily obscuring descriptions of the preferred embodiments Determining an entity's estimated compliance cost for rules regarding selected resources in one or more domains, including determining whether an entity has established a nexus with a domain based on the various different nexus rules for each domain, in a timely and efficient manner presents a technical problem for current ERP applications. Additionally, determining an entity's estimated compliance cost in conjunction with communicating such information to the entity in real-time or near real time, as resources are being tracked and as nexus rules are changing, in a timely and efficient manner over computer networks and in a way that integrates well into existing technical environments presents an additional technical problem. The present disclosure provides systems, computer-readable media, and methods that solve this technical problem by increasing the speed, efficiency and accuracy of such specialized software platforms and computer networks, thus improving the technology of ERP software applications and accounting applications. Therefore, the systems and methods for described herein for compliance cost estimation for an entity having established nexus with one or more domains and other techniques described herein, improves the functioning of computer or other hardware, such as by reducing the processing, storage, and/or data transmission resources needed to perform various tasks, thereby enabling the tasks to be performed by less capable, capacious, and/or expensive hardware devices, and/or be performed with less latency, and/or preserving more of the conserved resources for use in performing other tasks or additional instances of the same task.

Figure 1:
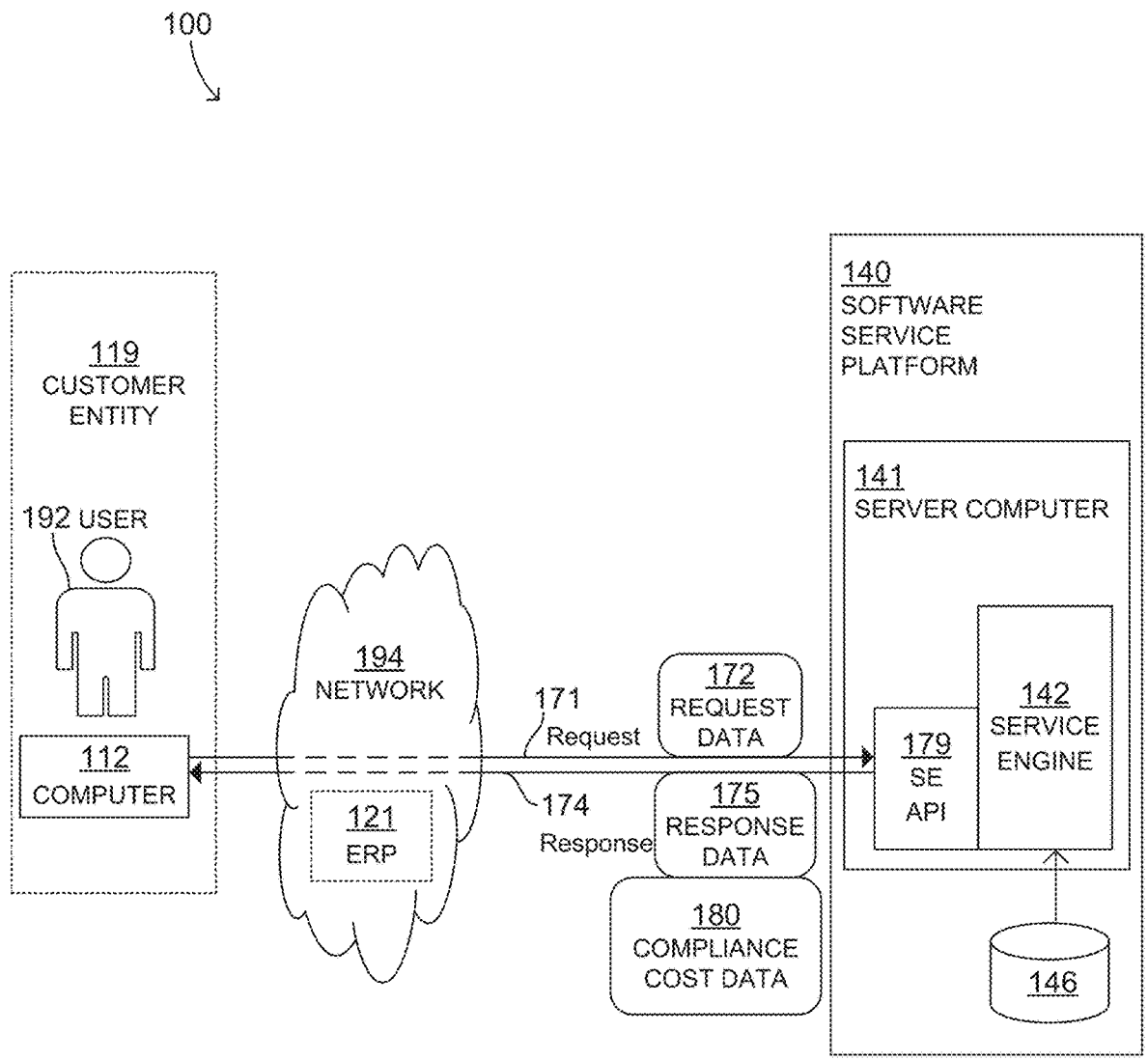
FIG. 1 is a block diagram showing an example configuration of a system, according to various embodiments of the present disclosure.

FIG. 1 is a block diagram showing an example configuration of a system, according to various embodiments of the present disclosure. The system shown in FIG. 1 generates compliance cost data 180 by using information received by the software service platform 140 from the customer entity 119.

Figure 2:
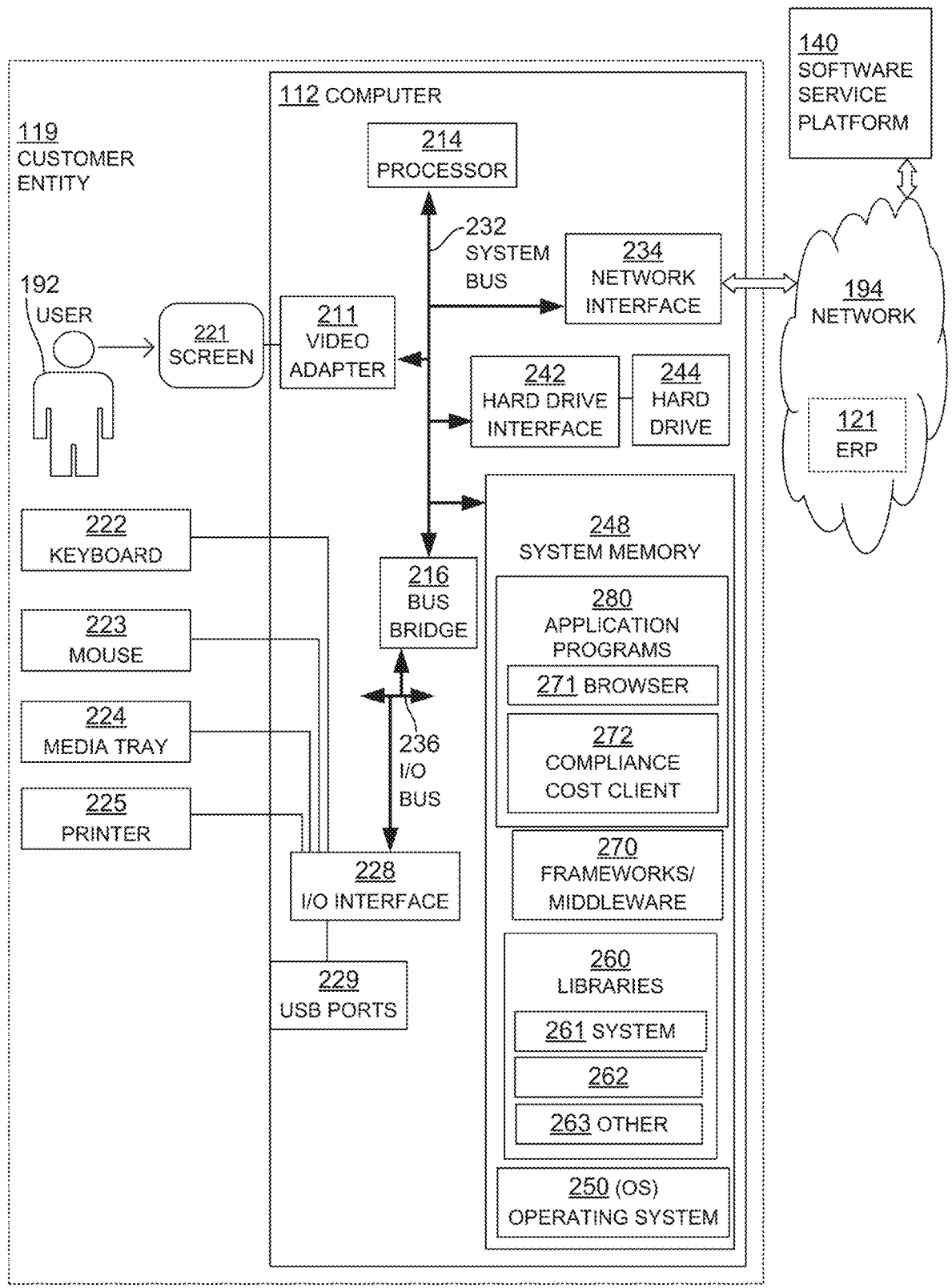
FIG. 2 is a block diagram showing more details of a computer of an example customer entity of FIG. 1, with reference to the communication network and the software service platform, according to various embodiments of the present disclosure.

In some embodiments, a customer entity 119 includes a computer 112, and a user 192 who may use computer 112. In some embodiments, the computer 112 and the user 192 are located within the same physical site of the customer entity 119. In some embodiments, the user 192 and the computer 112 are not located in the same physical site of the customer entity 119. FIG. 2 provides more detail concerning the computer 112.

In some embodiments, the network 194 is a communications network. Network 194 can be any type of network, such as a local area network (LAN), a metropolitan area network (MAN), a wide area network (WAN), or the internet. In some embodiments, network 194 is utilizes, or is part of, "the cloud." In some embodiments, the Enterprise Resource Planning (ERP) system 121 is within the network 194, located on "the cloud." In some embodiments, the ERP system 121 is accessible by computer 112 via the network 194.

In some embodiments, server computer 141 implements a software service platform 140 and hosts a database 146 storing data. In some embodiments, the server computer 141 implements the software service platform 140 on the cloud, on the premises of a provider, in a combination of the two, or through other means for implementing a software service.

In some embodiments, a single service uses additional server computers, for example in a peer-to-peer configuration, with the operations of the service distributed among them. The additional server computers can be located at a single geographic location or be distributed across multiple locations. Similarly, in some embodiments, additional databases may be used for the service, and so on.

Server computer 141 implements a service engine 142. Service engine 142 performs a predefined service. The service can be a computation, a search, a verification, a registration, a payment, a notification, generation of specialized information that could not be performed by pen and paper and so on. For example, according to various embodiments of the present disclosure, the service may be determining or generating information about the compliance cost of customer entity 119 in various domains based on rules about meeting nexus establishment conditions for those domains. In some embodiments, the transmission of such information may alert the customer entity 119 of an estimated compliance cost for handling selected resources across domains, where the customer entity 119 has established a nexus with the domains. The compliance cost data 180 may be or include such information about compliance costs.

In the context of FIG. 1, user 192 desires the service provided by the software service platform 140, and may even pay for it. User 192 uses computer 112 to access network 194 and accesses the software service platform 140 through the network 194. It will be appreciated that, in some contexts, service engine 142 performs cloud computing and is provided as software as a service (SaaS). Moreover, the software service platform can view the computer 112 as a client computer.

The service engine 142 performs a service responsive to being properly invoked. The service engine 142 may use data from database 146 while performing the service.

Server computer 141 further hosts a service engine (SE) Application Programming Interface (API) 179. In some embodiments, SE API 179 can invoke service engine 142 to perform its service, when properly requested. In various embodiments, service engine 142 may perform its service without invocation by SE API 179. For example, service engine 142 may also or instead automatically invoke itself to perform the applicable service periodically and/or in response to one or more various conditions being satisfied, including, but not limited to, one or more of: a detected change or update to the compliance cost based on a change or update about one or more nexus establishment conditions for one or more domains; a detected change or update to information associated with the customer entity 119 that may result in a change in the compliance cost for a certain domain; conditions indicated by stored preferences of customer entity 119; a detected change in the actions necessary to comply with one or more domains rules regarding selected resources, etc.

SE API 179 receives a request 171, which is shown as an arrow in FIG. 1. In some embodiments, the customer entity 119 transmits the request 171 via the network 194. In some embodiments, a user 192 causes the computer 112 to generate a request 171. In some embodiments, request 171 is transmitted via network 194 directly to SE API 179. In other embodiments, computer 112 causes ERP system 121 to transmit request 171. In yet other embodiments, ERP system 121 originates request 171 on behalf of customer entity 119.

Request 171 may also include associated request data 172. When SE API 179 receives request 171 with its request data 172, it invokes service engine 142. The SE API 179 then causes the service engine 142 to perform its service using request data 172. In response, SE API 179 transmits a response 174, also shown as an arrow. Response 174 may include response data 175 that arises out of the service, such as a computed result, a confirmation, and so on. The server computer 141 transmits the response 174, which may include compliance cost data 180, back to the sender of request 171, or to another device if otherwise directed.

In some embodiments, the ERP system 121 and/or computer 112 automatically generates and transits the request 171, in response to one or more various conditions being satisfied, including, but not limited to, one or more of: a detected change or update to the compliance cost based on a change or update about one or more nexus establishment conditions for one or more domains; a detected change or update to information associated with the customer entity 119 that may result in a change in the compliance cost for a certain domain; conditions indicated by stored preferences of customer entity 119; a detected change in the actions necessary to comply with one or more domains rules regarding selected resources, etc.

In some embodiments, the compliance cost data 180 may be used to update information regarding an account associated with the customer entity 119. The account associated with the customer entity 119 may be accessible by the customer entity 119 via a client computing device, for example, the computer 112, wherein the updated information is for display on a user interface associated with the account. In various embodiments, the user interface is a user interface of the server computer 141, computer 112, and/or a computer in ERP system 121, and so on. Furthermore, server computer 141, computer 112, and/or a computer in ERP system 121, and so on, may access, store, and/or manage the account associated with the customer entity 119.

Computer program code for carrying out operations for aspects of the present disclosure may be written in any combination of one or more programming languages, including an object-oriented programming language such as Java, Smalltalk or the like, and/or conventional procedural programming languages, such as the "C" programming language or similar programming languages such as C++, C sharp, etc. Portions of the program code may be executed on server computer 141, computer 112, a computer in ERP system 121, and so on.

Additional details about the components of FIG. 1, which may be known to some, are provided near the end of this description, for not interrupting the flow of this description at this stage.

FIG. 2 is a block diagram showing more details of a computer 112 of an example customer entity 119 of FIG. 1, with reference to the communication network 194 and the software service platform 140, according to various embodiments of the present disclosure.

FIG. 2 shows customer entity 119 of FIG. 1, along with more sample details for computer 112. Computer 112 may be a desktop computer, a laptop computer, a tablet computer, a mobile phone, and so on.

Computer 112 includes a processor 214. Computer 112 also includes a system bus 232 coupled to processor 214. System bus 232 can be used by processor 214 to control and/or communicate with other components of computer 112.

Computer 112 additionally includes a network interface 234 that is coupled to system bus 232. The computer 112 implements the network interface 234 by using a hardware network interface, such as a network interface card (NIC), wireless communication components, cellular communication components, Near Field Communication (NFC) components, Bluetooth® components such as Bluetooth® Low Energy, Wi-Fi® components, etc. Such a hardware network interface may have its own software, and so on. Network interface 234 can access network 194.

Also shown is a compliance cost client 272 residing in system memory 248, which may include computer-executable instructions executed by processor 214 to invoke or otherwise obtain services of the software service platform 140 provided by the service engine 142 running on server computer 141 of the software service platform 140. For example, the compliance cost client 272 may obtain and/or invoke the software service platform 140 to generate and/or transmit compliance cost data 180. In some embodiments, the resource compliance cost client 272 may generate a user interface for and/or provide access to an account associated with the customer entity 119 through which the compliance cost data 180 for the customer entity 119 may be accessible by the customer entity 119 via the computer 112. For example, information indicating whether the cost of compliance with the rules of a certain domain has changed, information indicating the actions necessary to comply with the rules of a certain domain, information indicating the amount of time it will take to take those actions, and information indicating a compliance cost may be displayed via the compliance cost client 272 on a user interface associated with the account and/or the compliance cost client 272. In various embodiments, the compliance cost client 272 is a part of, or is integrated with, the browser 271. In other embodiments, the browser 271 may be, or perform the operations of, the compliance cost client 272, for example, when the software service platform 140 provides web-based services.

Figure 3:
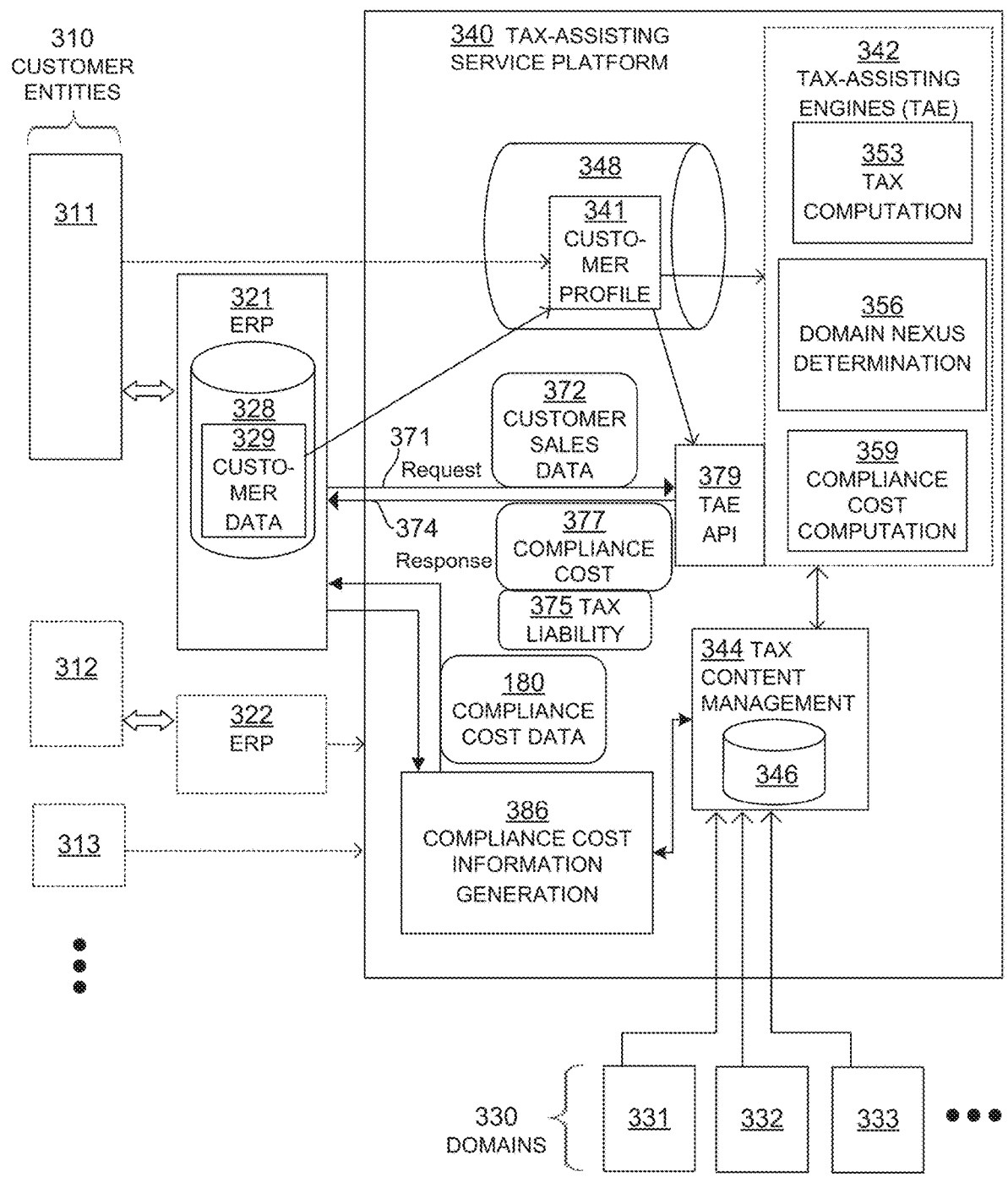
FIG. 3 is a block diagram showing an example software architecture working with a compliance cost information generation engine for implementing aspects of the present disclosure relating to an example use case, according to various embodiments of the present disclosure.

In some embodiments, the compliance cost client 272 may communicate and/or obtain services of ERP applications (e.g., ERP system 121), accounting applications, ecommerce applications and/or other applications remote from or resident on the computer 112. For example, the compliance cost client 272 may cause ERP system 121 to transmit a request or other information to the software service platform 140 that invokes services of the software service platform 140. This invocation of services of the software service platform 140 in turn causes software service platform 140 to provide services to the compliance cost client 272 and/or ERP system 121. For example, such information may include information indicative of one or more various conditions being satisfied, including, but not limited to, one or more of: a detected change or update to the compliance cost based on a change or update about one or more nexus establishment conditions for one or more domains; a detected change or update to information associated with the customer entity 119 that may result in a change in the compliance cost for a certain domain; conditions indicated by stored preferences of customer entity 119; a detected change in the actions necessary to comply with one or more domains rules regarding selected resources, etc. Additional details about FIG. 2 are provided near the end of this description, so as to not interrupt the flow of this description at this stage. FIG. 3 is a block diagram showing an example software architecture working with a compliance cost information generation engine 386 for implementing aspects of the present disclosure relating to an example use case, according to various embodiments of the present disclosure.

Use Case Example

Businesses often have to compute an amount of a selected resource that is realized or due to be collected when performing various business functions in one or more domains. The computation of these selected resources is often complex, and requires businesses to hire experts and/or implement or employ complex systems to perform these computations as well as to take the actions necessary for businesses to comply with the rules surrounding these selected resources. As a result, the businesses require an accurate prediction of the total cost to take necessary actions and hire experts and/or implement or employ such systems to make the relevant determinations they need to make, referred to throughout this application as the compliance cost.

One example use case for such one or more resources that utilizes embodiments described herein may be for purposes of calculating the compliance cost for determining and/or tracking transaction taxes. For example, when businesses make, sell, or buy goods, they are required by law to compute the amounts of money they must remit as taxes to various tax domains (e.g., states, counties, jurisdictions, municipalities, countries, etc.), and then remit these amounts to the tax domains. If they fail to accurately report and remit taxes, they may be subject to audits and fines—and ignorance of the law is not an excuse.

There are many types of taxes for businesses. Such taxes include sales tax, use tax, excise tax, value-added tax, industry-specific taxes, cross-border taxes, and so on (collectively referred to herein as "transaction taxes"). Further, for a single transaction, taxes may be due to more than one tax domain, such as different states, localities within the states, counties, cities, municipalities, etc.

Determining the taxes due is often very complex. There are over 10,000 domains or tax jurisdictions in the US, and almost 10 million taxability rules related to various products and services. Complexities in determining the sales tax due may arise from the location of the buyer, the seller, a distributor, etc. For example, some state and local authorities tax have origin-based rules, which means that a sales tax is charged from the seller's location; other state and local authorities tax have destination-based rules, which means that a sales tax is charged from the buyer's location. Additional complexities arise from the fact that different tax jurisdictions charge different percentage rates. These different tax jurisdictions can be different states, counties, cities, municipalities, special taxing jurisdictions, and so on.

In addition to calculating the cost of the tax, sellers of goods and services are subjected to many requirements about the taxes they must collect and remit. In particular, a seller must determine whether, and when, they must collect and remit transaction taxes in each tax jurisdiction. For example, for each state, a seller may need to register with that state's taxing agency, set up internal processes for collecting sales tax in accordance with the tax rules of the state, keep records for the collected sales tax, file reports with the state, and finally pay the tax to the state. In the U.S., retailers must have some kind of presence in a state before that state can require that retailer to collect and remit sales tax from buyers in that state. With the Supreme Court ruling in the South Dakota v. Wayfair case, not only does physical presence (such as a location, employee or inventory), but "economic" presence in a state may create sales tax nexus. In other words, due to the Wayfair ruling, even if a retailer does not have a physical presence in a state, if the retailer passes a state's economic threshold, for example, for total revenue or number of transactions in that state, the retailer is legally obligated to collect and remit sales tax to that state. However, different states have different thresholds for determining whether there is an economic nexus, which creates a problem for retailers in determining whether they are compliant with the tax rules in various jurisdictions, especially when the retailers have ever changing total revenue and numbers of transactions in various different jurisdictions.

Businesses often hire experts and/or implement or employ complex systems to make determinations related to whether they have an economic nexus with a domain or jurisdiction, to make determinations related to whether certain actions are necessary to comply with the domain or jurisdiction's rules, to take the actions required to comply with the domain or jurisdiction's rules, etc. Such rules may include filing rules that include, but are not limited to: rules for content, format, scheduling, due, dates and/or timing of filing tax returns, tax forms, remittance forms, reconciliation forms, transaction tax collection records, transaction records, accounting records, reconciliations, financial records and other documentation regarding transaction taxes. The businesses, experts and complex systems do not have a reliable and efficient way to compute the cost of taking those actions in regards to the experts' or systems' time, labor, system license costs, communication costs, data services, etc., as well as the cost of making the determination of whether the business has established an economic nexus with the domain or jurisdiction.

It will be appreciated that, for use cases, the determination of the burden and the estimation of the compliance cost may aid entities, such as businesses, in planning how to best meet the compliance burden.

Embodiments described herein may be utilized (e.g., by system 100 of FIG. 1 or compliance cost information generation engine 386 and compliance cost computation engine 359 of FIG. 3) to receive datasets, each data set including information about transactions performed by a certain entity that does not belong in a first domain with one or more entities that belong in the first domain; look up nexus rules for entities that do not belong in the first domain to establish a nexus with the first domain based on transactions of the entities that do not belong in the first domain with other entities that belong in the first domain; determine from the received datasets and from the looked-up nexus rules, that the certain entity has established a nexus with the first domain; look up, responsive to the certain entity having established the nexus, filing rules of the first domain which are applicable to the certain entity due to the certain entity having established the nexus; compute from the looked-up filing rules and the received datasets, an estimated compliance cost for the certain entity to comply with the looked-up filing rules; and cause the estimated compliance cost to be communicated to a computing device.

The compliance cost information generation engine 386 in communication with the compliance cost computation engine 359 via the tax content management 344 component may compute an estimated cost over one or more predetermined time periods for determining a selected resource (e.g., an amount of tax) due to a domain based on an entity having established the nexus with the domain. For example, estimated compliance cost may be based on an estimated number of total hours over one or more predetermined time periods for the entity to procure services to determine tax liability or amount of tax due to the entity having established the nexus.

The tax-assisting service platform 340 stores a record of aggregate transactions for the entity for a given period of time which may be compared to rules about establishing nexus for purposes of remitting transaction tax in a plurality of tax jurisdictions, which may include statutory rule threshold records that include rules regarding a monetary amount of sales that are associated with each of various tax jurisdictions and/or a total number of sales transactions that are associated with each of various tax jurisdictions. The tax-assisting service platform 340 additionally stores information regarding compliance costs for compliance with rules in a plurality of tax jurisdictions, such as costs for preparing paperwork, hourly rates, costs to take certain actions, standardized fees, costs for determining whether a business has established a nexus with a tax jurisdiction, a timeline describing when fees are due, etc. The tax-assisting service platform 340 then utilizes this stored information to predict a total compliance cost an expert may charge a business to take the actions necessary for the business to comply with the tax jurisdiction's rules.

The present example embodiment involves a use case of a software-implemented platform for assisting in service related to a selected resource, such as taxes. In the present example, tax-assisting service platform 340 is configured to provide services regarding a selected resource, such as tax-related services. These services may include computing the compliance cost for customer entities 310 which meet the nexus establishment conditions for one or more domains 330, determining when an entity no longer meets a nexus establishment condition for a domain, and determining if the compliance costs have changed as a result. In some embodiments, these services may also include providing notifications to the customer entities 310, monitoring for updated rules regarding nexus establishment conditions, prompting the customer entities 310 for information, etc. Any one of sample customer entities 311, 312, 313, . . . may be as described for customer entity 119. These customer entities 310 may access a software-implemented tax-assisting service platform 340, for receiving its resource-related services.

Aspects of FIG. 3 may be implemented by components described and shown elsewhere in this document, for example with reference to FIG. 1 and FIG. 2. For instance, in some embodiments, customer entities 310 access tax-assisting service platform 340 fully directly, for example as is shown for customer entity 313. In other embodiments, customer entities 310 access the tax-assisting service platform 340 at least in part indirectly, for example by using Enterprise Resource Planning (ERP) systems 321, 322. In this example, ERP system 321 has a database 328 that stores customer data 329 of customer entity 311, such as sales data or other transaction data. For example, the compliance cost information generation engine 386 may use such sales data to determine a potential change in the compliance cost for various domains 330 for the customer entities 310. In this example, tax-assisting service platform 340 includes a database 348, and customer entity 311 has stored their own customer profile 341 in database 348.

Tax-assisting service platform 340 includes a tax content management component 344 for use by TAE 342 and the compliance cost information generation engine 386. Tax content management component 344 may receive resource information from one or more domains 330, such as sample domains 331, 332, 333, and so on. Tax content management component 344 includes a database 346 for storing the received resource information in the form of nexus establishment conditions, resource calculation rules, filing rules, rates, exemptions, compliance fees, compliance actions, etc. For example, the database 346 may store rules related to each of the various domains 330. In some embodiments, the database 346 stores rules about establishing nexus and filing rules for purposes of computing resources in the various domains 330. In some embodiments, the database 346 stores rules about the actions required to comply with the rules regarding selected resources in various domains 330. In some embodiments, the database 346 stores rules about meeting or exceeding one or more thresholds regarding information associated with a domain (e.g., sales or use) over a period of time.

Tax-assisting service platform 340 includes tax-assisting engines 342. In some embodiments, TAE 342 includes a tax computation engine 353, a domain nexus determination engine 356, and a compliance cost computation engine 359.

In this example, a TAE Application Programming Interface (API) 379 invokes the tax-assisting engines 342. In some embodiments, the tax-assisting service platform implements only one TAE API 379. In other embodiments, the tax-assisting service platform implements multiple TAE APIs 379, for example, one for invoking each of tax computation engine 353, domain nexus determination engine 356, and compliance cost computation engine 359. In this example, TAE API 379 receives a request 371 or other information from ERP 321. Request 371 has customer sales data 372 of customer entity 311. In some embodiments, the tax-assisting service platform 340 obtains customer sales data 372 from customer data 329 in database 328. In various embodiments, the tax-assisting service platform 340 transmits data 372 to one or more of the tax-assisting engines 342 in response to a request from the respective tax-assisting engine. In some embodiments, data 372 may also or instead be pushed to one or more of the tax-assisting engines 342 from one or more of the customer entities 310 and/or ERP system 321, such as in response to the customer data 329 being updated or changed, or on a periodic basis. In response to receiving request 371 with its data 372, TAE API 379 invokes one or more of tax-assisting engines 342 to perform its service. Then, TAE API 379 transmits a response 374. The tax-assisting service platform 340 transmits the response 374 back to the sender of request 371, or to a different entity, computer, device, etc.

In some embodiments, customer data 329 may be pushed to the compliance cost information generation engine 386 from one or more of the customer entities 310 and/or ERP system 321, such as in response to the customer data 329 being updated or changed, or on a periodic basis. In response to receiving this information, the compliance cost information generation engine 386 may perform its service and respond by sending the compliance cost data 180, which may be the compliance cost data 180 of FIG. 1. The tax-assisting service platform 340 transmits the compliance cost data 180 back to the sender of the customer data 329, to a corresponding one of the customer entities 310, or to a different entity, computer, device, etc.

In various embodiments, the compliance cost information generation engine 386 may also or instead automatically invoke itself to perform the applicable service in response to one or more various conditions being satisfied, including, but not limited to, one or more of: a detected change or update to the compliance cost based on a change or update about one or more nexus establishment conditions for one or more domains; a detected change or update to information associated with one of the customer entities 310 that may result in a change in the compliance cost for a certain domain; conditions indicated by stored preferences of one of the customer entities 310; a detected change in the actions necessary to comply with one or more domains rules regarding selected resources, etc. For example, such stored rules, including the thresholds, may be stored in the database 346 of the tax content management component 344 and accessible by the compliance cost information generation engine 386. Also, records of the resource computation or information associated with the customer entities 310 for resource computation may comprise and/or be part of the customer data 329 and transmitted to the compliance cost information generation engine 386. The stored preferences of one or more of the customer entities 310 may also comprise and/or be part of the customer data 329 and transmitted to the compliance cost information generation engine 386.

In some embodiments, the ERP system 321 and/or one or more of the customer entities 310 may automatically generate and/or transmit the customer data 329 to the compliance cost information generation engine 386, in response to one or more various conditions being satisfied, including, but not limited to, one or more of: a detected change or update to the compliance cost based on a change or update about one or more nexus establishment conditions for one or more domains; a detected change or update to information associated with one of the customer entities 310 that may result in a change in the compliance cost for a certain domain; conditions indicated by stored preferences of the one of the customer entities 310; a detected change in the actions necessary to comply with one or more domains rules regarding selected resources, etc.

In response to such the customer data 329 being automatically generated and/or transmitted to the compliance cost information generation engine 386, or in response to the compliance cost information generation engine 386 invoking itself when certain conditions are satisfied, the compliance cost information generation engine 386 may generate and/or transmit compliance cost data 180 based on received customer data 329. In some embodiments, compliance cost data 180 may be or include information about compliance costs, such as: the compliance costs once an entity has met a nexus establishment condition, the compliance costs once an entity no longer meets a nexus establishment condition, the compliance costs once an entity potentially meets a nexus establishment condition in the future, the actions necessary to comply with rules after a nexus is established, a prediction of the compliance costs over a period of time, or other information associated with the compliance cost for selected resources in a domain where the customer entity has established a nexus.

The compliance cost information generation engine 386 may periodically, or upon the customer data 329 being updated, receive entity information (e.g., customer sales data) that consists or is included in the customer data 329 for one or more of domains 330 in which selected resources are computed. The compliance cost information generation engine 386 may then compare the received entity information of the customer data 329 against rules stored in database 346 to determine the customer entity's compliance cost by using the tax-assisting engines 342. If, for example, based on the entity information included in the customer data 329, the domain nexus determination engine 356 determines that the total number of transactions involving a selected resource (e.g., sales transactions) or total monetary value of such transactions of customer entity 311 meet, are within a predetermined threshold of meeting, exceed, or no longer meet a threshold indicated by the rules regarding a nexus establishment condition for domain 331, then the domain nexus determination engine 356 determines whether the customer entity 311 must abide by the rules of the domain 331 for collecting or remitting transaction taxes. Following this determination by the domain nexus determination engine 356, the compliance cost computation engine 359 determines which actions are required to comply with the rules in domain 331 and how much time and/or resources are needed to take those actions. Then the compliance cost computation engine 359 computes the compliance cost for complying with the rules associated with domain 331. In various embodiments, computing the estimated compliance cost is based on, according to the looked-up filing rules, one or more of: a format or type of data to be reported to a domain regarding remitting a selected resource, an amount of data to be reported to a domain regarding remitting a selected resource, and a frequency of reporting data regarding remitting a selected resource for a domain. The compliance cost computation engine 359 may determine, based on looked-up filing rules from database 346, a frequency of reporting data regarding remitting a selected resource for a domain based on the entity having established the nexus with the domain. The compliance cost computation engine 359 may then compute the estimated compliance cost for the certain entity based on the determined frequency of reporting data regarding remitting the selected resource for the domain. In various embodiments, the compliance cost information generation engine 386 may perform such a service based on monitoring updates to the rules stored in database 346 and monitoring the information of the customer data 329 for each of the customer entities 310 for each of the domains 330 without needing to receive a specific request for such a service.

In some embodiments, the tax-assisting service platform uses the compliance cost data 180 to update information regarding the total cost or the actions necessary for one of the customer entities 310 to comply with the rules established for one of the domains 330. For example, an account associated with the customer entity 311 may be associated with or include customer profile 341 and is accessible by the customer entity 311 via the tax-assisting service platform 340, wherein the updated information is displayed on a user interface associated with the account. Furthermore, the account associated with the customer entity 311 may be managed, stored and/or accessible by the customer entity 311, the tax-assisting service platform 340, and/or the ERP system 321.

If the request 371 invokes the tax computation engine 353, the tax computation engine 353 may calculate a selected resource liability of an amount of selected resources due, based on data 372. In that case, response 374 includes a component of a tax liability 375 that indicates the calculated amount.

If the request 371 invokes the domain nexus determination engine 356, the domain nexus determination engine 356 determines if a customer entity has established a nexus with at least one of domains 330, based on data 372. In that case, response 374 may include such information as a component of a compliance cost 377, such as the domains 330 for which a customer entity 311 must comply with the rules regarding selected resources.

If request 371 invokes the compliance cost computation engine 359, the compliance cost computation engine 359 computes a predicted compliance cost for domains which the domain nexus determination engine 356 has determined the customer entity 311 has established a nexus with, based on data 372. In some embodiments, the compliance cost computation engine 359 computes the compliance cost by taking into account the actions which the customer entity 311 must take, the cost to perform those actions, and/or the time to perform those actions. In some embodiments, the compliance cost computation engine 359 also compares the predicted compliance cost to prior compliance costs to generate alerts to the customer entity 311 that the predicted compliance costs have changed based on changes in the nexus determination, changes in the actions required to comply with domain rules, etc. In that case, response 374 may include such information as a component of the compliance cost 377, such as a total predicted compliance cost for the customer entity 311, or a predicted change in compliance cost for the customer entity 311.

In some embodiments, the tax-assisting service platform 340 may additionally perform a variety of services such as, for example, accumulating and storing customer sales data 372.

In another example, tax-assisting engines 342 and/or the compliance cost information generation engine 386 may further include one or more additional engines and/or functional components than are shown in the example of FIG. 3. Such additional engines and/or functional components, upon being invoked, can perform additional resource-related services, such as: a) register one or more of customer entities 310 with one or more appropriate domains 330, b) generate resource returns, i.e., prepare forms for filing by customer entities 310, c) file electronically such returns with the appropriate ones of domains 330, and so on. In some embodiments, one or more of such services may be performed by the TAE 342 and/or the compliance cost information generation engine 386 for one or more of the customer entities 310, or a notification may be transmitted to one or more of the customer entities 310 that such services are available or recommended, in response to a determination by the compliance cost information generation engine 386 that the entity meets or no longer meets a nexus establishment condition for domains 330 and how resources are to be computed for these domains 330.

FIGS. 4-8 each depict example graphical user interfaces of embodiments of the present disclosure, where the selected resources and domains are transaction taxes and tax jurisdictions respectively, as a visual example of the use-case discussed above. The information depicted in the example graphical user interfaces and the interactivity of such information may include and/or be based on information received from the tax-assisting service platform 340, such as that generated by the compliance cost computation engine 359 and compliance cost information generation engine 386, as described herein. In some embodiments, the computer 112 implements the example graphical user interfaces of FIGS. 4-8 based on receiving such information from the tax-assisting service platform 340.

Figure 4:
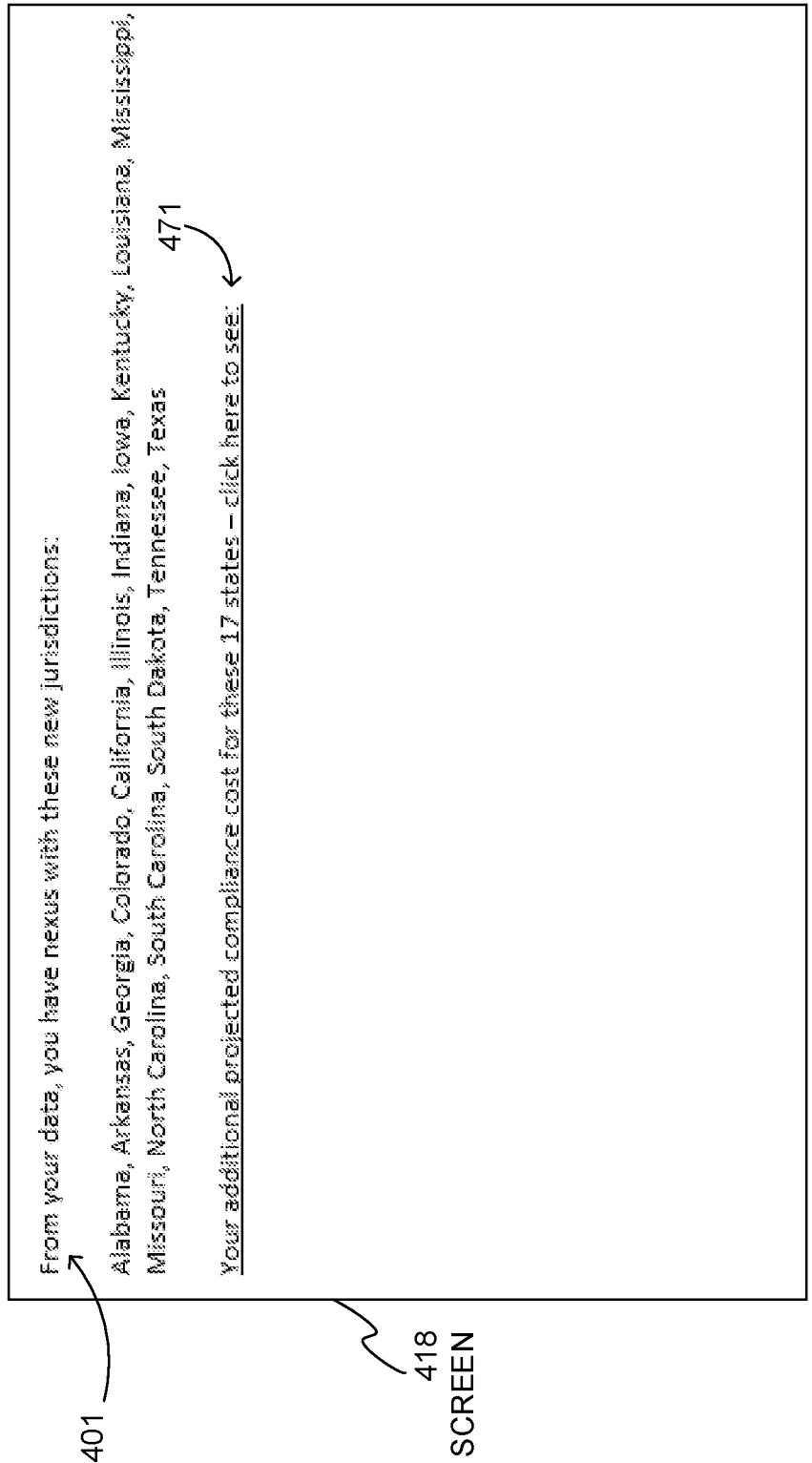
FIG. 4 depicts an example jurisdiction nexus display graphical user interface, according to various embodiments of the present disclosure.

FIG. 4 depicts an example jurisdiction nexus display graphical user interface 401, according to various embodiments of the present disclosure. In some embodiments, the computer 112 implements the jurisdiction nexus display graphical user interface 401. The jurisdiction nexus display graphical user interface 401 includes a screen 418 and an additional compliance cost link 471. The screen 418 displays text indicating to a user the tax-assisting service platform 340 has determined the customer has established a nexus with new jurisdictions and lists the jurisdictions for which the customer has established a nexus. The screen 418 also displays the link 471, which, when selected, directs a user, such as user 192, to the projected compliance costs for each of the new jurisdictions upon receiving user interaction. An example is shown below.

FIG. 5 depicts an example jurisdiction compliance cost display graphical user interface 502, according to various embodiments of the present disclosure. It will be recognized that, advantageously in these examples, the graphical user interface 502 can be arrived at independently, or in response to selecting or activating the additional compliance cost link 471 of FIG. 4. In fact, lines above that link might not change at all from the previous interface, to give the user a better sense of control as they navigate.

In some embodiments, the jurisdiction compliance cost display graphical user interface 502 includes a screen 518 which displays a rate textbox 570, an estimations table 572, and a calendar link 581. The rate textbox 570 contains the rate which a customer entity 311 may be charged per hour of work performed on their behalf. In this example, the rate indicated by the rate textbox 570 is changed by clicking the "edit" link and receiving input for a new rate, which the tax-assisting service platform 340 will use to compute a new compliance cost.

The estimations table 572 includes rows for each new jurisdiction, and columns indicating information about the compliance cost for each jurisdiction as calculated by the tax-assisting service platform 340. In particular, the tax-assisting service platform 340 identifies jurisdictions for which the customer entity 311 has established a nexus. These jurisdictions are then displayed in the first column, labeled "new jdx," which indicates the names of each new jurisdiction. The tax-assisting service platform 340 determines the frequency at which the customer entity 311 must take an action, such as filing a return, for each jurisdiction to comply with the jurisdiction's rules; these frequencies are displayed in the "Return to be filed" column. The tax-assisting service platform 340 predicts how much time it will take to complete these actions based on the data received from the customer entity 311, and displays the prediction in the "estimated time to complete per your data" column. The "update" link present in the "estimated time to complete per your data" column additionally directs a customer entity 311 to a user interface directed towards uploading new data that the customer entity 311 has received. In some embodiments, new data is received from the customer entity 311 automatically. The tax-assisting service platform 340 additionally calculates the estimated total cost for each jurisdiction, as well as the total cost for all jurisdictions annually. The total cost for each jurisdiction is displayed in the "Estimated total:" column, and the total annual cost is displayed at the bottom of the example jurisdiction compliance cost display graphical user interface 502. In this example, jurisdiction "A" requires a quarterly return which will take 3 hours to complete, and cost $150 per quarter at a $50 per hour rate, thus the estimated compliance cost for jurisdiction A is $150 per quarter, or $600 per year. Additionally, in this example, the total compliance cost for all jurisdictions is $2,050 per year. In some embodiments, the estimation table 572 displays more information to the user, such as actions other than filing returns, the amount of time required to complete each aspect of filing a return or taking an action, such as filling out forms, ensuring funds are in place to make payments, prepaying funds, and so on, or the number of actions that need to be taken, etc.

The individual filing calendars link 581 directs the user to another user interface which allows the user to view filing calendars for individual jurisdictions, such as described below, for example.

Figure 6:
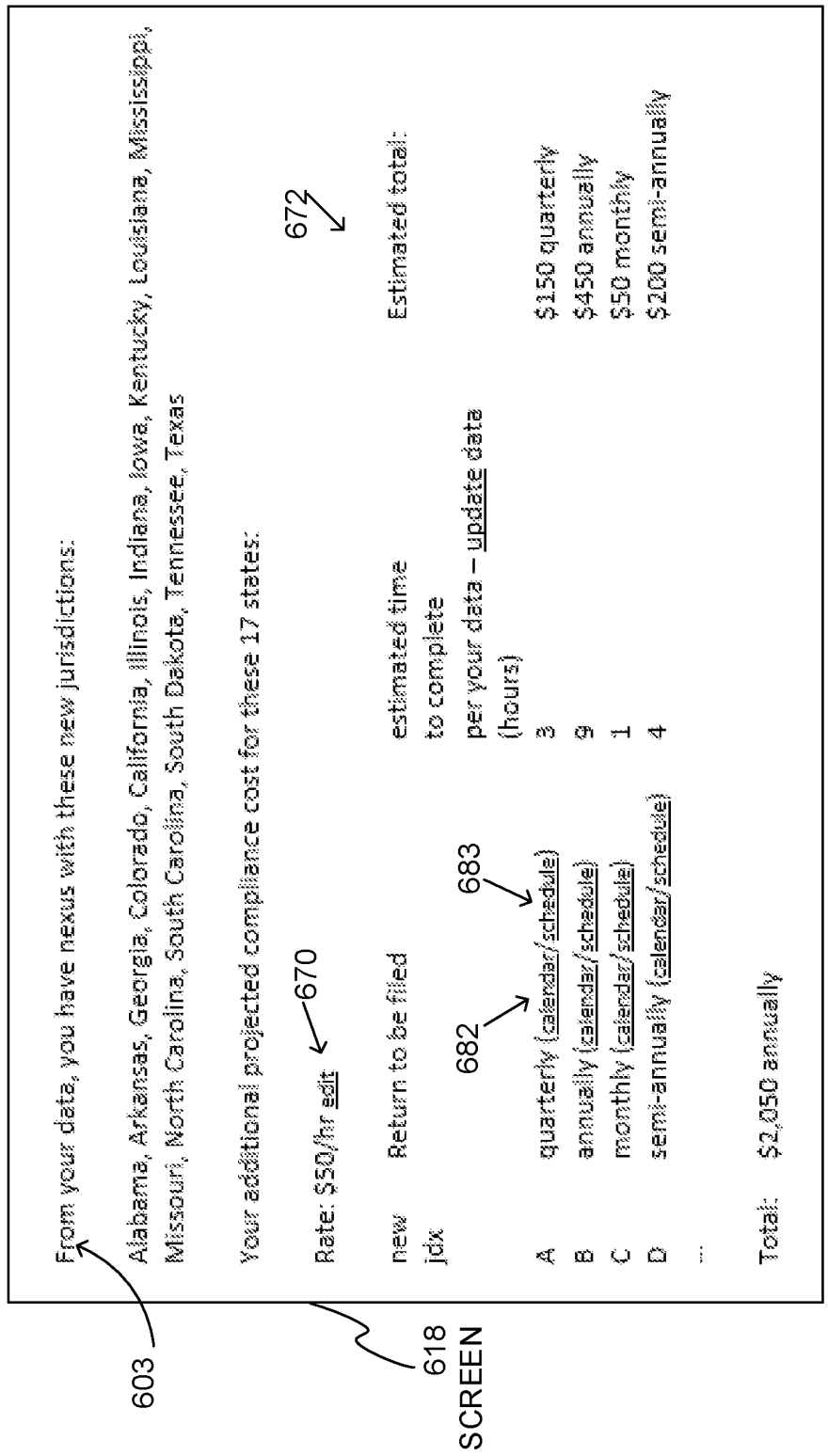
FIG. 6 depicts an example detailed jurisdiction compliance cost display graphical user interface, according to various embodiments of the present disclosure.

FIG. 6 depicts an example detailed jurisdiction compliance cost display graphical user interface 603, according to various embodiments of the present disclosure. It will be recognized that, advantageously in these examples, the graphical user interface 603 can be arrived at independently, or in response to selecting or activating the individual filing calendars link 581 of FIG. 5. In fact, lines above that link might not change at all from the previous interface, to give the user a better sense of control as they navigate.

In some embodiments, the jurisdiction compliance cost display graphical user interface 603 includes a screen 618 which displays a rate textbox 670, and an estimations table 672. In this example, the rate textbox 670 and estimations table 672 operate similarly to the rate textbox 570 and estimations table 572 respectively, of FIG. 5. In the example embodiment, the entries in the "Return to be filed" column of the estimations table 672 include a "calendar" link 682 and a "schedule" link 683 for each displayed frequency of filing, namely quarterly, annually, monthly and semi-annually.

The tax-assisting service platform 340 determines the actions which must be taken by a customer entity 311 to comply with a jurisdiction's rules and when those actions must be taken based on the filing rules stored in database 346. The calendar link 682 directs the user to a graphical user interface displaying a calendar, such as the compliance cost calendar graphical user interface 703 depicted in FIG. 7, populated with determined dates related to each of the scheduled actions a customer entity 311 must take. The schedule link 683 directs the user to a graphical user interface, such as the compliance cost schedule graphical user interface 803 depicted in FIG. 8, displaying a list of the determined dates related to each of the scheduled actions a customer entity 311 must take to comply with the jurisdiction's rules. The tax-assisting service platform 340 may generate one or more data structures including data representing selected resource remittance conditions, selected resource remittance due dates, frequency of remittance of a selected resource, and calendars or schedules indicating information associated with when or how the selected resource is to be remitted. Each of the data structures may be specific to a domain based on the looked-up filing rules in database 346 of the domain applicable to the entity. The tax-assisting service platform 340 may cause one or more data structures to be communicated along with the estimated compliance cost to computing device 112 of customer entity 119. In various embodiments, the tax-assisting service platform 340 may generate one or more calendars, notices and/or schedules indicating information associated with when or how a selected resource is to be remitted to a domain based on the looked-up filing rules of the domain applicable to the entity. The tax-assisting service platform 340 may cause such calendars, notices and schedules to be communicated to computing device 112 of customer entity 119.

For example, FIG. 7 depicts an example compliance cost calendar graphical user interface 703, according to various embodiments of the present disclosure. It will be recognized that, advantageously in these examples, the graphical user interface 703 can be arrived at independently, or in response to selecting or activating the "monthly" individual link 682 of FIG. 6.

The data populated in the compliance cost calendar graphical user interface 703 is for example only, and embodiments of the present disclosure may populate the compliance cost calendar graphical user interface 703 with different data. Here, the first item on the calendar, indicated at square 710, indicates that Tuesday the 10th is the Reconciliation Date for Forms A and B. The next item on the calendar, indicated at square 712, indicates that Prepayment for Form A is due on Wednesday the 12th. The next item on the calendar, indicated at square 714, indicates that the funds for Remittance of Form A must be in place by Friday the 13th. The next item on the calendar, indicated at square 716, indicates that the funds for Remittance of Form B must be in place by Tuesday the 17th. The next item on the calendar, indicated at square 718, indicates that both Form A and Remittance of the Funds for Form A are due on Wednesday the 18th. Finally, square 720 indicates that both Form B and Remittance of the Funds for Form B are due on Wednesday the 20th. Each of these actions displayed on the compliance cost calendar graphical user interface 703 correspond to actions which the tax-assisting service platform 340 has determined the customer entity 311 must take to ensure the customer entity 311 will comply with the jurisdiction's rules. Likewise, the compliance cost calendar graphical user interface 703 indicates to a user when actions incorporated in the total compliance cost are, or must be, taken.

Figure 8:
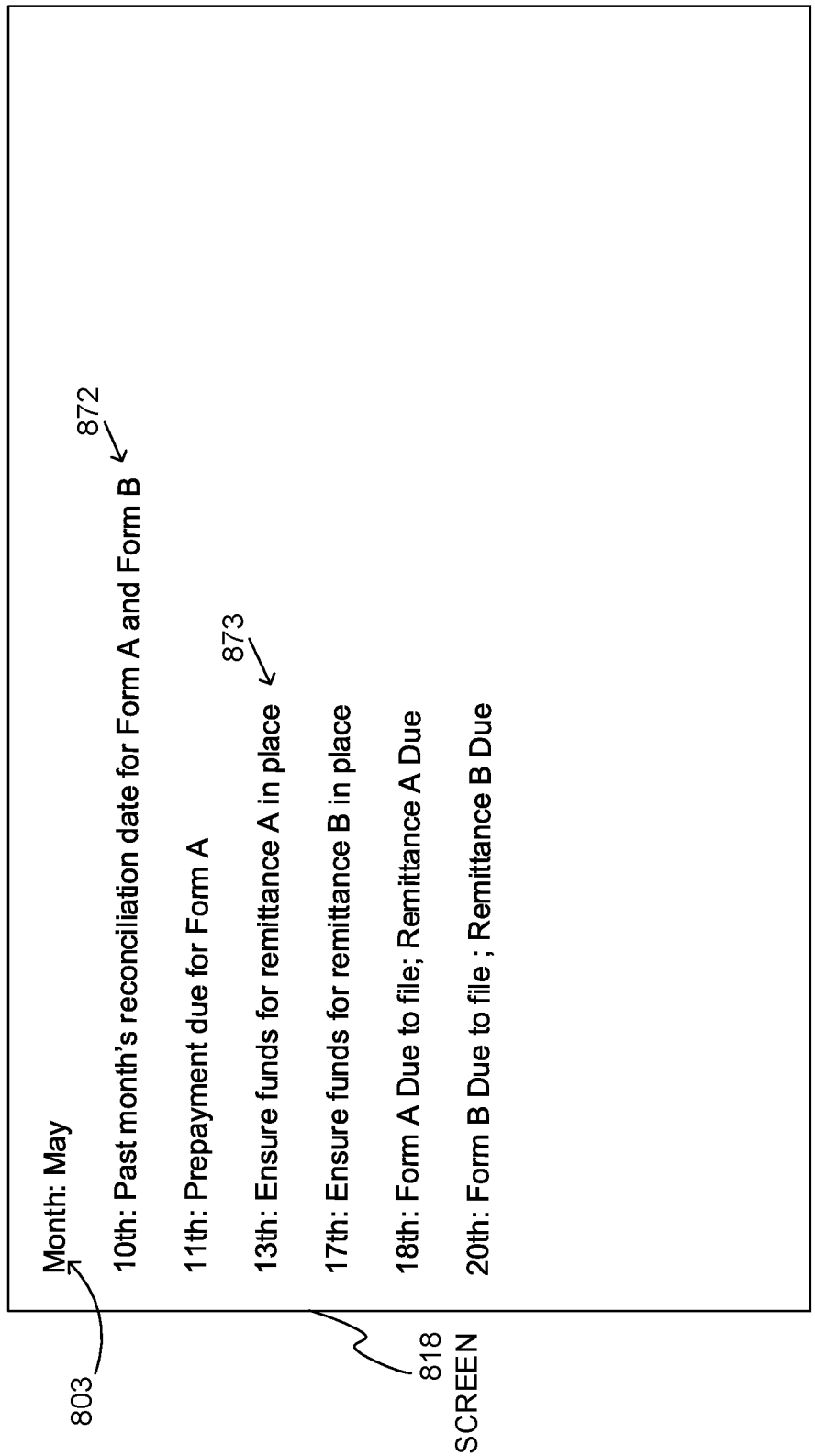
FIG. 8 depicts an example compliance cost schedule graphical user interface, according to various embodiments of the present disclosure.

FIG. 8 depicts an example compliance cost schedule graphical user interface 803, according to various embodiments of the present disclosure. It will be recognized that, advantageously in these examples, the graphical user interface 803 can be arrived at independently, or in response to selecting or activating the "monthly" individual link 683 of FIG. 6.

The data populated in the compliance cost schedule graphical user interface 803 is for example only, and embodiments of the present disclosure may populate the compliance cost schedule graphical user interface 803 with different data, or may display the data differently. The compliance cost schedule graphical user interface 803 displays a list of dates corresponding to actions the tax-assisting service platform 340 has determined the customer entity 311 must take to comply with a jurisdiction's rules. Entry 872 indicates that May 10th is the past month's reconciliation date for Forms A and B. Entry 873 indicates that on May 13th the funds for remittance of form A should be in place. Also, such data structures, including schedules and calendars, may be communicated by making the one or more data structures available for downloading upon causing the estimated compliance cost to be displayed, such as in the graphical user interfaces of FIGS. 4-8.

Operation of Certain Aspects

The operation of certain aspects of the disclosure will now be described with respect to FIGS. 9-11. In at least one of various embodiments, processes 900, 1000, and 1100 described in conjunction with FIGS. 9, 10, and 11, respectively, may be implemented by or executed on one or more computing devices, such as tax-assisting service platform 340 of FIG. 3. The following descriptions of processes 900, 1000, or 1100 discuss the processes being implemented by the compliance cost information generation engine 386 on the tax-assisting service platform 340 of FIG. 3. Embodiments, however, are not so limited and other engines, modules, or computing devices may perform one or more portions of processes 900, 1000, or 1100.

Figure 9:
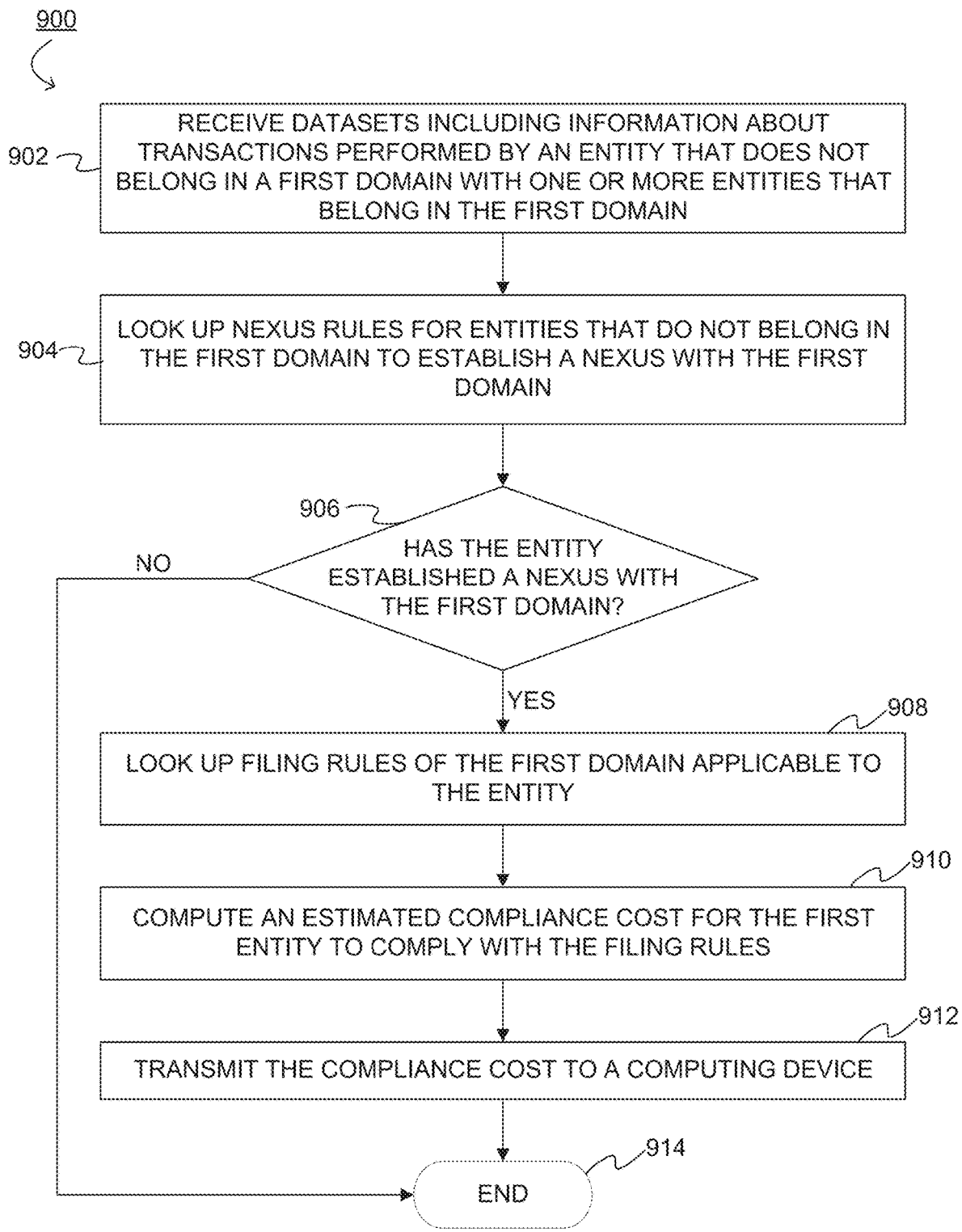
FIG. 9 is a flow diagram of an example process useful for computing an estimated compliance cost for an entity having established nexus with a first domain, according to various embodiments of the present disclosure.

FIG. 9 is a flow diagram of an example process 900 useful for computing an estimated compliance cost for an entity having established nexus with a first domain, according to various embodiments of the present disclosure.

Process 900 begins at act 902 where the tax-assisting service platform 340 receives datasets including information about transactions performed by the customer entity 311 with one or more other entities, where the customer entity 311 does not belong in the domain of the one or more other entities. At act 904, the tax-assisting service platform 340 then looks up the nexus rules regarding whether an entity has established a nexus with the domain. At act 906, the tax-assisting service platform 340 determines if the customer entity 311 has established a nexus with the domain, based on the nexus rules obtained in act 904 and the transaction data obtained at act 902. If the tax-assisting service platform 340 determines that the entity has not established a nexus with the first domain, process 900 moves to act 914 and the process ends. If the tax-assisting service platform 340 determines that the entity has established a nexus with the first domain, the process continues to act 908.

At act 908, the tax-assisting service platform 340 uses tax assisting engines 342 and the tax content management 344 components to look up the filing rules applicable to the customer entity 311 in the first domain. At act 910, the tax-assisting service platform 340 uses the compliance cost computation engine 359 to compute an estimated compliance cost for the customer entity 311 to comply with the filing rules by using the compliance cost computation engine 359. At act 912, the tax-assisting service platform 340 transmits the computed compliance cost to a computing device. In some embodiments, tax-assisting service platform 340 transmits the computed compliance cost information as part of a response that includes other information, such as tax liability data.

Figure 10:
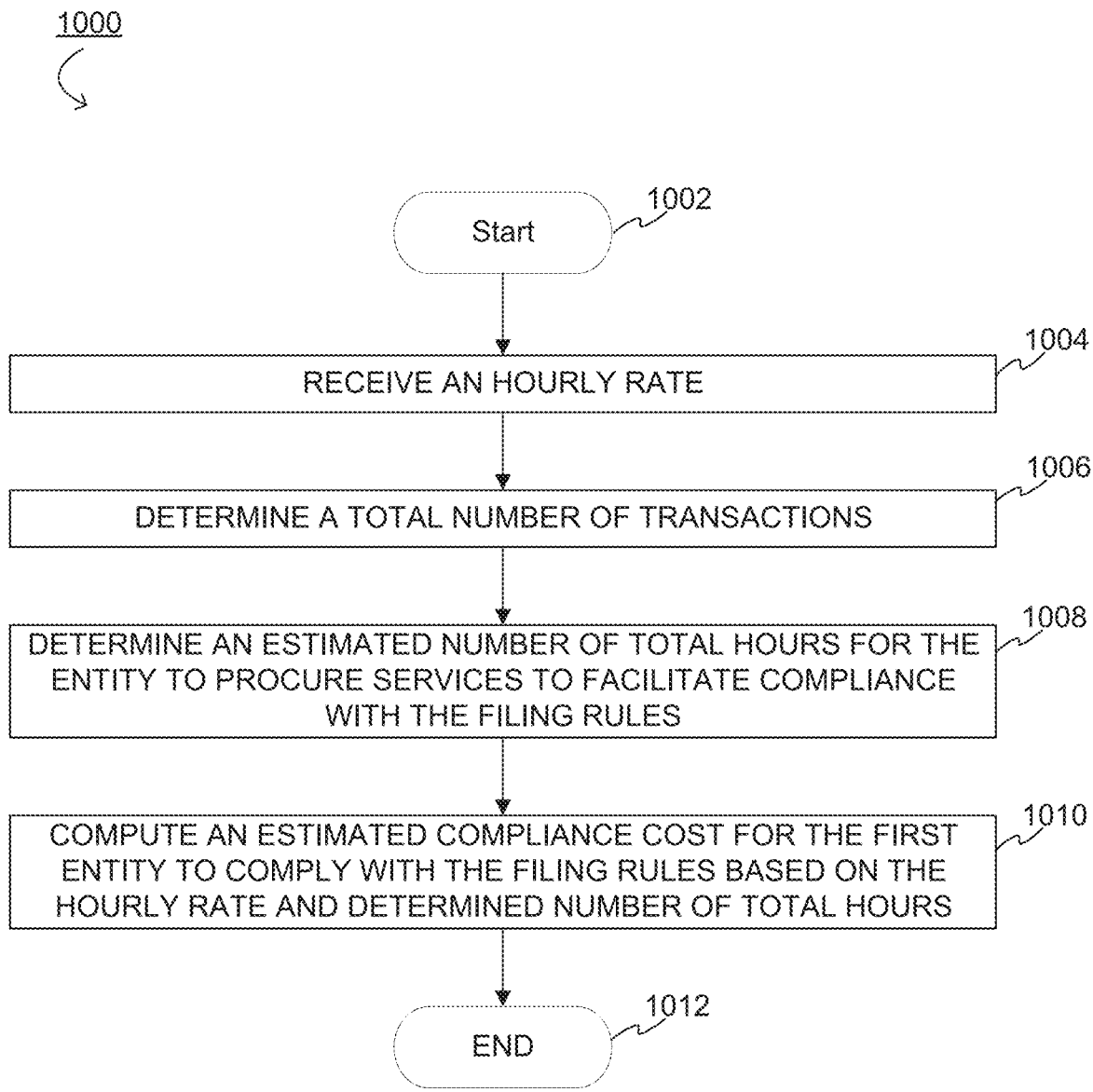
FIG. 10 is a flow diagram of an example process for computing an estimated compliance cost for an entity based on an hourly rate and a total number of transactions useful in the process disclosed in FIG. 9, according to various embodiments of the present disclosure.

FIG. 10 is a flow diagram of an example process for computing an estimated compliance cost for an entity based on an hourly rate and a total number of transactions 1000 useful in the process disclosed in FIG. 9, according to various embodiments of the present disclosure. In some embodiments, the tax-assisting compliance platform 340 performs process 1000 as part of act 910 disclosed in FIG. 9.

Process 1000 begins at act 1004, where the tax-assisting service platform 340 receives an hourly rate from the compliance cost information generation engine 386. At act 1006, the tax-assisting service platform 340 determines the total number of transactions from the datasets received, such as at act 902 of FIG. 9. At act 1008, the tax-assisting service platform 340 determines an estimated total number of hours for the customer entity to procure services to facilitate compliance with the filing rules by using the tax-assisting engines 342 and compliance cost information generation engine 386. The tax-assisting engines 342 and the compliance cost information generation engine 386 determine which rules apply to the customer entity 311 and the amount of time needed to take the actions necessary to comply with those rules. At act 1010, the tax-assisting service computes an estimated compliance cost for the customer entity 311 to comply with the filing rules based on the hourly rate and the determined total number of hours. In some embodiments, the tax-assisting service 340 multiplies the hourly rate by the total number of hours to determine the estimated compliance cost.

Figure 11:
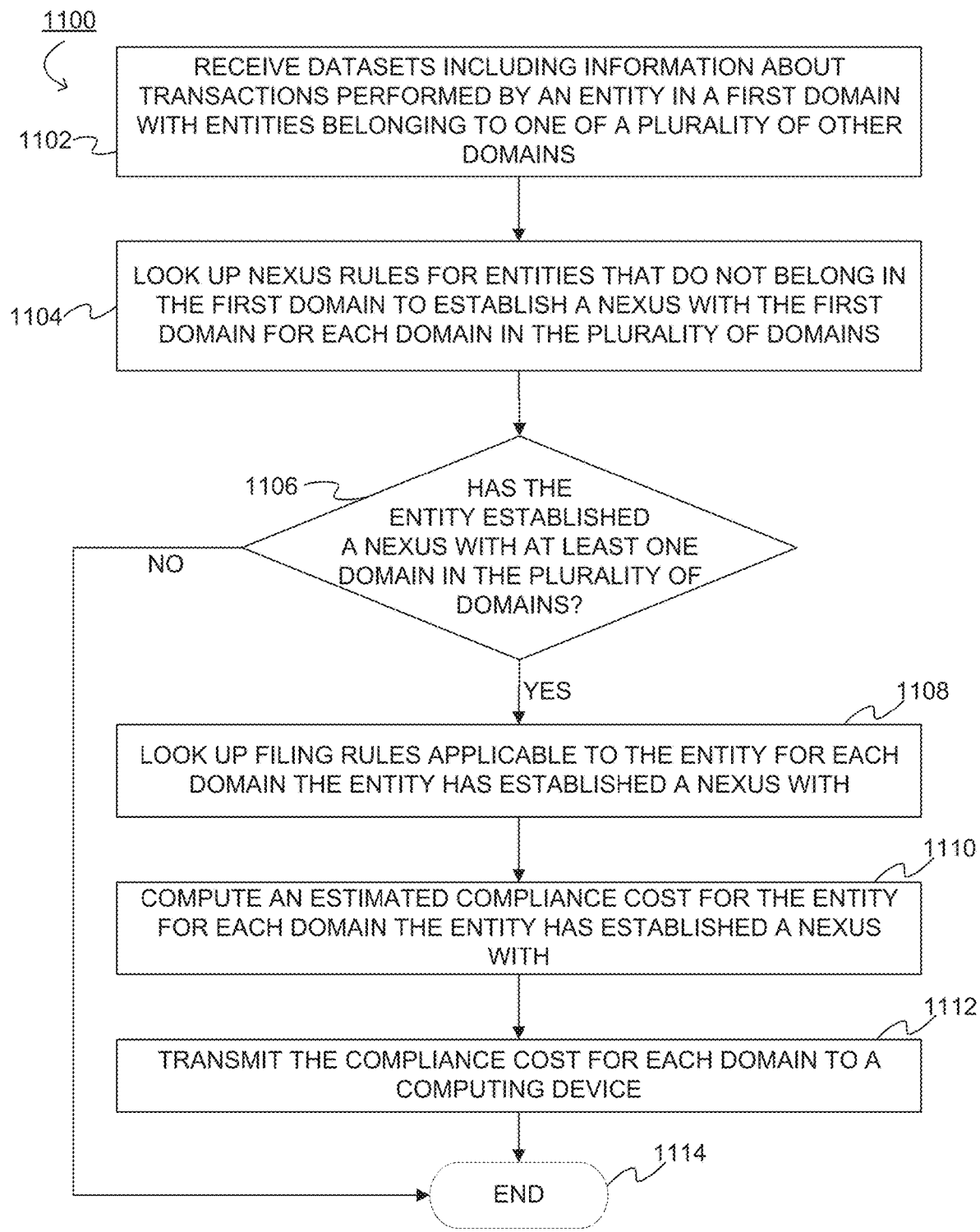
FIG. 11 is a flow diagram of another example process useful for computing an estimated compliance cost for an entity having established nexus with multiple domains, according to various embodiments of the present disclosure.

FIG. 11 is a flow diagram of another example process useful for computing an estimated compliance cost for an entity having established nexus with multiple domains 1100, according to various embodiments of the present disclosure.

Process 1100 begins at act 1102, where the tax-assisting service platform 340 receives datasets including information about transactions performed by the customer entity 311 in a first domain with entities belonging in one of a plurality of other domains. At act 1104, the tax-assisting service platform 340 looks up the nexus rules for entities that do not belong in the first domain to establish a nexus with the first domain for each domain in the plurality of other domains. In some embodiments, the tax-assisting service platform 340 utilize tax content management component 344 to look up the nexus rules. At act 1106, the tax-assisting service platform 340 determines whether the customer entity 311 has established a nexus with at least one of the plurality of domains. In some embodiments, the tax-assisting service platform 340 uses the domain nexus determination engine 356 to determine whether the customer entity 311 has established a nexus with at least one of the plurality of domains. If the customer entity 311 has not established a nexus with at least one of the plurality of domains, the process moves to at 1114 and ends. If the customer entity 311 has established a nexus with at least one of the plurality of domains the process proceeds to act 1108.

At act 1108, the tax-assisting service platform 340 uses the tax-assisting engines 342 and the tax content management component 344 to look up the filing rules applicable to the customer entity 311 in each of the domains with which the customer entity 311 has established a nexus. At act 1110, the tax-assisting service engine 340 uses the compliance cost computation engine 359 to compute an estimated compliance cost for each domain with which the customer entity 311 has established a nexus. In some embodiments, the tax-assisting service platform 340 uses process 1000 determine the estimated compliance cost for each domain with which the customer entity 311 has established a nexus. At act 1112, the tax-assisting service platform 340 transmits the compliance cost for each domain to a computing device. In some embodiments, tax-assisting service platform 340 transmits the computed compliance cost information as part of a response that includes other information, such as tax liability data.

Additional Details

Additional details about FIG. 1 and FIG. 2 are now provided. Computer 112 further includes a video adapter 211, which is also coupled to system bus 232. Video adapter 211 may be able to drive and/or support a screen 221 that is used by user 192 together with computer 112.

In addition to screen 221, other peripheral input/output (I/O) devices that may be used together with computer 112 include a keyboard 222, a mouse 223, a media tray 224 and a printer 225. Media tray 224 may include storage devices such as CD-ROM drives, multi-media interfaces, and so on. Computer 112 moreover includes an I/O interface 228 connected to these peripheral I/O devices as shown, for the purpose of communicating with them. In this example, these connections are direct. Alternately, one or more of these connections may take place via universal serial bus (USB) ports 229 of computer 112, to which I/O interface 228 is also connected.

Computer 112 moreover includes a bus bridge 216 coupled to system bus 232, and an input/output (I/O) bus 236. I/O bus 236 is coupled to bus bridge 216 and to I/O interface 228.

Computer 112 also includes various memory components. A non-volatile memory component is a hard drive 244. Computer 112 further includes a hard drive interface 242 that is coupled to hard drive 244 and system bus 232.

Additional memory components are in a system memory 248, which is also coupled to system bus 232. System memory includes volatile memory including, but not limited to, cache memory, registers and buffers. In embodiments, data from hard drive 244 populates registers of the volatile memory of system memory 248.

Sample system memory 248 has a software architecture that uses a stack of layers, with each layer providing a particular functionality. In this example the layers include— starting from the bottom—an operating system (OS) 250, libraries 260, frameworks/middleware 270 and application programs 280, which are also known as applications 280. Other software architectures may include less, more or different layers. For example, a presentation layer may also be included. For another example, some mobile or special purpose operating systems may not provide a frameworks/middleware 270.

OS 250 may manage hardware resources and provide common services. Libraries 260 provide a common infrastructure that is used by applications 280 and/or other components and/or layers. Libraries 260 provide functionality that allows other software components to perform tasks in a more easy fashion than to interface directly with the specific underlying functionality of OS 250. Libraries 260 may include system libraries 261, such as a C standard library. System libraries 261 may provide functions such as memory allocation functions, string manipulation functions, mathematical functions, and the like.

In addition, libraries 260 may include API libraries 262 and other libraries 263. API libraries 262 may include media libraries, such as libraries to support presentation and manipulation of various media formats such as MPREG4, H.264, MP3, AAC, AMR, JPG, and PNG. API libraries 262 may also include graphics libraries, for instance an OpenGL framework that may be used to render 2D and 3D in a graphic content on screen 221. API libraries 262 may further include database libraries, for instance SQLite, which may support various relational database functions. API libraries 262 may additionally include web libraries, for instance WebKit, which may support web browsing functionality.

Frameworks/middleware 270 may provide a higher-level common infrastructure that may be used by applications 280 and/or other software components/modules. For example, frameworks/middleware 270 may provide various graphic user interface (GUI) functions, high-level resource management, high-level location services, and so forth. Frameworks/middleware 270 may provide a broad spectrum of other APIs that may be used by applications 280 and/or other software components/modules, some of which may be specific to OS 250 or to a platform.

Application programs 280 are also known more simply as applications and apps. One such app is a browser 271. Browser 271 is an example of a renderer, which includes program modules and instructions that enable computer 112, to exchange network messages with network 194 using hypertext transfer protocol (HTTP) messaging.

Other such applications 280 may include a contacts application, a book reader application, a location application, a media application, a messaging application, and so on. Applications 280 may be developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. Applications 280 may use built-in functions of OS 250, libraries 260, and frameworks/middleware 270 to create user interfaces for user 192 to interact with.

The hardware elements depicted in computer 112 are not intended to be exhaustive. Rather, they are representative, for highlighting essential components that can be used with embodiments.

Instructions for performing any of the methods or functions described herein may be stored, completely or partially, within the memory components of server computer 141, computer 112, etc. These memory components include the indicated memory components, plus cache memory within the processors such as processor 214. Accordingly, these memory components are examples of machine-readable media.

In this context, "machine-readable medium" or "computer-readable medium" refers to a component, device or other tangible media able to store instructions and data temporarily or permanently and may include, but is not limited to, a portable computer diskette, a thumb drive, a hard disk, random-access memory (RAM), read-only memory (ROM), buffer memory, flash memory, optical media, magnetic media, cache memory, an Erasable Programmable Read-Only Memory (EPROM), an optical fiber, a portable compact disc read-only memory (CD-ROM), an optical storage device, a magnetic storage device, or any suitable combination of the foregoing.

The term "machine-readable medium" or "computer-readable medium" should be taken to include a single medium or multiple media (e.g., a centralized or distributed database, or associated caches and servers) able to store instructions that a machine such as a processor can store, erase, or read. The term "machine-readable medium" or "computer-readable medium" shall also be taken to include any medium, or combination of multiple media, that is capable of storing instructions (e.g., code) for execution by a machine, such that the instructions, when executed by one or more processors of the machine, cause the machine to perform any one or more of the methods described herein. Accordingly, instructions transform a general, non-programmed machine into a particular machine programmed to carry out the described and illustrated functions in the manner described.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Processor 214, as well as the processor of server computer 141, is a physical circuit that manipulates physical quantities representing data values. The manipulation can be according to control signals, which can be known as commands, op codes, machine code, etc. The manipulation can produce corresponding output signals that are applied to operate a machine. As such, a processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), a Field-Programmable Gate Array (FPGA), an Application Specific Integrated Circuit (ASIC), any combination of these, and so on. A processor may further be a multi-core processor having two or more independent processors that execute instructions. Such independent processors are sometimes called "cores."

A hardware component such as a processor may also include programmable logic or circuitry that is temporarily configured by software to perform certain operations. For example, a hardware component may include software executed by a general-purpose processor or other programmable processor. Once configured by such software, hardware components become specific machines, or specific components of a machine, uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

As used herein, a "component" may refer to a device, physical entity or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, including:
   at least one processor; and
   a memory coupled to the at least one processor, the memory storing instructions that, when executed by the at least one processor, cause the system to perform operations including:
   receiving datasets, each data set including information about transactions performed by a certain entity that does not belong in a first domain with one or more entities that belong in the first domain;
   electronically looking up, by a compliance cost information generation engine, via a records request function or subroutine to a nexus rules database, electronically stored nexus rules for entities that do not belong in the first domain to establish a nexus with the first domain based on transactions of the entities that do not belong in the first domain with other entities that belong in the first domain;
   determining, from the received datasets and from the looked-up nexus rules, that the certain entity has established a nexus with the first domain, wherein the determining that the certain entity has established a nexus with the first domain includes:
   determining a total amount of resources associated with transactions of the certain entity with other entities that belong in the first domain;
   determining a total number of the transactions of the certain entity with other entities that belong in the first domain;
   determining whether the total amount of resources or the total number of the transactions exceeds one or more respective thresholds; and
   determining that the certain entity has established a nexus with the first domain based on a determination that the total amount of resources or the total number of the transactions exceeds one or more respective thresholds;
   electronically looking up, by the compliance cost information generation engine, via a records request function or subroutine to a filing rules database, and responsive to the certain entity having established the nexus, electronically stored filing rules of the first domain which are applicable to the certain entity due to the certain entity having established the nexus;
   a specialized service engine of a server computer automatically invoking itself to compute, from the looked-up filing rules and the received datasets, an estimated compliance cost for the certain entity to comply with the looked-up filing rules, in which the computing the estimated compliance cost includes performing in real-time or near real-time as resources are being electronically tracked via a computer network for a plurality of entities for purposes of computing compliance costs for the plurality of entities:
   electronically receiving an hourly rate;
   computing, from the received datasets, a total number of the transactions;
   computing, based on the looked-up filing rules, an estimated number of total hours for the certain entity to procure services to facilitate compliance with the filing rules for the determined total number of the transactions;
   computing the estimated compliance cost based on the hourly rate and the determined estimated number of total hours;
   causing the estimated compliance cost to be communicated to a computing device;
   the specialized service engine of the server computer electronically generating on a first graphical user interface a calendar hyperlink that directs a user to a calendar graphical user interface;
   the specialized service engine of the server computer electronically generating on the first graphical user interface a schedule hyperlink that directs a user to a schedule graphical user interface;
   in response to the specialized service engine electronically receiving an electronic selection of the calendar hyperlink, the specialized service engine electronically generating the calendar graphical user interface for display on a client computing system display device;
   the specialized service engine electronically populating the calendar graphical user interface with different data including determined dates related to scheduled actions regarding the estimated compliance cost;
   in response to the specialized service engine electronically receiving an electronic selection of the schedule hyperlink, the specialized service engine electronically generating the schedule graphical user interface for display on the client computing system display device; and
   the specialized service engine electronically populating the schedule graphical user interface with different data including determined dates related to scheduled actions regarding the compliance costs.

2. The system of claim 1 in which computing the estimated compliance cost includes computing an estimated cost over one or more predetermined time periods for determining a selected resource due to the first domain based on the certain entity having established the nexus with the first domain, the selected resource to be determined according to the looked-up filing rules.

3. The system of claim 1 in which computing the estimated compliance cost is based on an estimated number of total hours over one or more predetermined time periods for the certain entity to procure services to determine a selected resource due to the certain entity having established the nexus.

4. The system of claim 1 in which the computing the estimated compliance cost is based on, according to the looked-up filing rules, one or more of: a format or type of data to be reported to the first domain regarding remitting a selected resource, an amount of data to be reported to the first domain regarding remitting a selected resource, and a frequency of reporting data regarding remitting a selected resource for the first domain.

5. The system of claim 1 in which the computing the estimated compliance cost for the certain entity includes:
   determining, based on the looked-up filing rules, a frequency of reporting data regarding remitting a selected resource for the first domain based on the certain entity having established the nexus with the first domain; and
   computing the estimated compliance cost for the certain entity based on the determined frequency of reporting data regarding remitting the selected resource for the first domain.

6. The system of claim 1 in which the instructions, when executed by the at least one processor, further cause the system to perform operations for a plurality of entities simultaneously or near simultaneously in real-time, the operations including, for each respective entity of the plurality of entities:
inputting a respective hourly rate;
determining, from received datasets, a respective total number of respective transactions;
determining, based on respective looked-up filing rules, respective estimated number of total hours for the respective entity to procure services to facilitate compliance with the respective looked-up filing rules for the respective determined total number of the respective transactions; and
computing a respective estimated compliance cost based on the respective hourly rate and the determined respective estimated number of total hours.

7. The system of claim 6, in which the instructions, when executed by the at least one processor, further cause the system to perform operations including:
presenting a selectable option to change the hourly rate used in the computation; and
recalculating the estimated compliance cost using the changed hourly rate instead of the hourly rate.

8. The system of claim 1 in which the causing the estimated compliance cost to be communicated is performed automatically in response to the determination that the certain entity has established a nexus with the first domain.

9. The system of claim 1 in which the computing the estimated compliance cost is further based on one or more forms required to be submitted to the first domain per the filing rules.

10. The system of claim 1 in which the instructions, when executed by the at least one processor, further cause the system to perform operations including:
generating one or more of: calendars, notices and schedules indicating information associated with when or how a selected resource is to be remitted to the first domain based on the looked-up filing rules of the first domain applicable to the certain entity; and
causing the one or more of: calendars, notices and schedules to be communicated to the computing device.

11. The system of claim 1 in which the instructions, when executed by the at least one processor, further cause the system to perform operations including:
generating one or more data structures including data representing one or more of: selected resource remittance conditions, selected resource remittance due dates, frequency of remittance of a selected resource, and calendars or schedules indicating information associated with when or how the selected resource is to be remitted, in which each of the one or more data structures is specific to first domain based on the looked-up filing rules of the first domain applicable to the certain entity; and
causing the one or more data structures to be communicated along with the estimated compliance cost.

12. The system of claim 11 in which the one or more data structures are caused to be communicated by making the one or more data structures available for downloading.

13. The system of claim 12 in which the one or more data structures are caused to be communicated by making the one or more data structures available for downloading upon causing the estimated compliance cost to be displayed.

14. The system of claim 1, in which the certain entity does not belong in each domain of a plurality of domains and in which the instructions, when executed by the at least one processor, further cause the system to perform operations including:
receiving datasets, each dataset including information about transactions performed by the certain entity with a plurality of entities in which each domain of the plurality of domains is a domain in which at least one of entity of the plurality of entities belongs; and
for each domain of the plurality of domains:
looking up nexus rules for entities that do not belong in the domain to establish a nexus with the domain based on transactions of the entities that do not belong in the domain with other entities that belong in the domain;
determining, from the received datasets and from the looked-up nexus rules for entities that do not belong in the domain, that the certain entity has established a nexus with the domain;
looking up, responsive to the certain entity having established the nexus with the domain, filing rules of the domain which are applicable to the certain entity due to the certain entity having established the nexus with the domain;
computing, from the looked-up filing rules of the domain and from the received datasets, an estimated compliance cost for the certain entity to comply with the looked-up filing rules of the domain; and
causing the estimated compliance cost for the certain entity to comply with the looked-up filing rules of the domain to be communicated to a computing device.

15. The system of claim 14 in which the instructions, when executed by the at least one processor, further cause the system to perform operations including:
computing a total compliance cost for the plurality of domains based on the estimated compliance cost computed for each domain of the plurality of domains; and
causing the total compliance cost for the plurality of domains to be communicated to the computing device.

16. The system of claim 14 in which the causing the estimated compliance cost for each domain of the plurality of domains to be communicated is performed automatically in response to the determination that the certain entity has established a nexus with each domain of the plurality of domains.

17. The system of claim 14 in which the computing the estimated compliance cost for each domain of the plurality of domains is further based on one or more forms required to be submitted to one or more of the plurality of domains per the filing rules.

18. The system of claim 14 in which the instructions, when executed by the at least one processor, further cause the system to perform operations including:
generating one or more of: calendars, notices and schedules indicating information associated with when or how a selected resource is to be remitted to one or more of the plurality of domains based on respective filing rules associated with each of the plurality of domains and applicable to the certain entity; and
causing the one or more of: calendars, notices and schedules to be communicated to the computing device.

19. The system of claim 14 in which the instructions, when executed by the at least one processor, further cause the system to perform operations including:
generating one or more data structures including data representing one or more of: selected resource remittance conditions, selected resource remittance due dates, frequency of remittance of a selected resource, and calendars or schedules indicating information associated with when or how the selected resource is to be remitted, in which each of the one or more data structures is specific to one of the plurality of domains based on respective rules associated with each of the plurality of domains responsive to the certain entity having established nexus with each of the plurality of domains; and causing the one or more data structures to be communicated along with the estimated compliance cost for the certain entity.

* * * * *